United States Patent
Gardner et al.

(10) Patent No.: US 7,061,932 B2
(45) Date of Patent: Jun. 13, 2006

(54) CODE-DIVISION MULTIPLE-ACCESS (CDMA) WIRELINE TELEMETRY SYSTEM

(75) Inventors: Wallace R. Gardner, Houston, TX (US); Roger L. Schultz, Aubrey, TX (US); Beegamudre N. Murali, Houston, TX (US); Manfred G. Prammer, Downingtown, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 192 days.

(21) Appl. No.: 10/288,970

(22) Filed: Nov. 6, 2002

(65) Prior Publication Data

US 2004/0085988 A1 May 6, 2004

(51) Int. Cl.
*H04B 7/216* (2006.01)
(52) U.S. Cl. .................................... 370/441; 340/853.3
(58) Field of Classification Search ................ 370/441, 370/479, 320, 335, 342, 203, 204, 208, 319, 370/344, 480, 503, 509; 340/853.1, 853.2, 340/853.3, 853.4
See application file for complete search history.

(56) References Cited

U.S. PATENT DOCUMENTS

| | | | | |
|---|---|---|---|---|
| 3,648,278 | A * | 3/1972 | Miller | 341/169 |
| 5,691,974 | A * | 11/1997 | Zehavi et al. | 370/203 |
| 5,745,837 | A | 4/1998 | Fuhrmann | |
| 5,768,269 | A | 6/1998 | Rakib et al. | |
| 5,793,759 | A | 8/1998 | Rakib et al. | |
| 5,805,583 | A | 9/1998 | Rakib | |
| 5,872,491 | A * | 2/1999 | Kim et al. | 333/101 |
| 5,991,308 | A | 11/1999 | Fuhrmann et al. | |
| 5,996,376 | A | 12/1999 | Johnson et al. | |
| 6,469,636 | B1 | 10/2002 | Baird et al. | |
| 6,693,553 | B1 * | 2/2004 | Ciglenec et al. | 340/853.1 |
| 6,798,338 | B1 * | 9/2004 | Layton | 340/310.01 |
| 6,817,412 | B1 * | 11/2004 | Haase | 166/250.01 |
| 2002/0000316 | A1 * | 1/2002 | Haase | 166/244.1 |
| 2002/0141487 | A1 * | 10/2002 | Bradley | 375/148 |
| 2002/0169645 | A1 * | 11/2002 | Aronstam et al. | 705/7 |
| 2004/0192315 | A1 * | 9/2004 | Li et al. | 455/447 |

OTHER PUBLICATIONS

Harmuth, Henning, F., "Applications Of Walsh Functions In Communications," IEEE Spectrum, Nov., 1969, pp. 82-91.
Viterbi, Andrew J., "CDMA: Principles Of Spread Spectrum Communication," 1995, pp. 4-8, 23-33, 60-66, and 155-166, Addison-Wesley Publishing Company, Reading, Massachusetts, USA.
Walsh, J.L., "A Closed Set Of Orthogonal Functions," American Journal Of Math, 1923, vol. 45, Harvard University, pp. 5-24.

* cited by examiner

*Primary Examiner*—Brian D. Nguyen
(74) *Attorney, Agent, or Firm*—Conley Rose, P.C.

(57) ABSTRACT

A downhole telemetry system employing code division multiple access (CDMA) is disclosed. In one embodiment, the downhole telemetry system comprises one or more downhole transmitters and an uphole receiver. Each of the downhole transmitters transmits a corresponding uplink signal which is generated using amplitude modulation of corresponding code word signals. The code word signals are orthogonal to each other, and the transmitters may be configured to adjust the timing to assure synchronous arrival of the various uplink signals at the receiver. Each of the transmitters may be allocated a different number of code words when it is desired to allow for unequal bandwidth requirements. Such allocation is preferably dynamic. Additional modulation techniques may be employed with CDMA, including frequency division multiplexing, time division multiplexing, and frequency re-use. In the preferred embodiment, the uplink signals are transported over a multi-conductor wireline cable, but other physical channels are also contemplated.

18 Claims, 4 Drawing Sheets

CODE-DIVISION MULTIPLE-ACCESS (CDMA) WIRELINE TELEMETRY SYSTEM

BACKGROUND

Modern petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

An alternative method of logging is the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Sensors or transducers typically are located at the lower end of the drill string in LWD systems. While drilling is in progress these sensors continuously or intermittently monitor predetermined drilling parameters and formation data and transmit the information to a surface detector by some form of telemetry. Typically, the downhole sensors employed in LWD applications are positioned in a cylindrical drill collar that is positioned close to the drill bit. The LWD system then employs a system of telemetry in which the data acquired by the sensors is transmitted to a receiver located on the surface.

Yet another method of gathering downhole data is seismic imaging. One method of seismic imaging involves stringing hundreds of listening devices, or geophones, along the length of a borehole in the Earth near a location where a characteristic picture of the underground formations is desired. Geophones include particle velocity detectors for measuring both compressional and shear waves directly. Geophones typically provide three-component velocity measurement, and consequently can be used to determine the direction of arrival of incident elastic waves. Once these geophones are strategically placed, a seismic disturbance is created which creates traveling waves through the Earth's crust. As these traveling waves encounter boundaries of strata having varying densities, portions of the traveling wave reflect on their way to the seismic array. These varying density stratas may include changes in strata components as well as varying densities encountered at boundaries of hydrocarbon reservoirs. By measuring the propagation time, amplitude and direction of reflected waves as they reach the array, a three-dimensional representation of the formations lying below the surface of the Earth can be constructed ("3D seismic imaging").

After a particular hydrocarbon formation is found, the need for information is not alleviated. Once a hydrocarbon reservoir is tapped, the goal becomes removing as much of the hydrocarbons from the reservoir as possible. Here again, the more information one has about the locations of hydrocarbons within the reservoir over the course of time, the more likely the hydrocarbons contained in the reservoir can be fully extracted at the lowest possible cost. Having multiple three-dimensional seismic representations of conditions below the surface over time is typically referred to as four-dimensional (4D) seismic imaging. In early implementations, four-dimensional seismic was created by performing multiple three-dimensional seismic images of the strata or hydrocarbon reservoir in question. The time period for taking readings to determine migration patterns of the hydrocarbons may be as long as years. That is, a single three-dimensional seismic reading may be taken once a year over the course of several years to obtain the four-dimensional seismic image.

One fundamental requirement of both 3D and 4D seismic imaging is measuring the arrival time of reflected waves at one location relative to arrival of reflected waves at another location. To accomplish this task, large quantities of information must be recorded, substantially simultaneously, to correlate the arrival time of the various reflected waves.

Information is the key to being profitable in the oil and gas industry. The more information that can be gathered, the higher the efficiency of the drilling and extraction operations can be made. To this end, new and more sophisticated sensor arrangements are routinely created and placed in the borehole, so much so that the information carrying capacity of traditional telemetry techniques are becoming inadequate. For these reasons it would be desirable to have a communication technique that can support high speed communications between downhole sensors and a surface installation.

SUMMARY

The problems noted above are solved in large part by a downhole telemetry system employing code division multiple access (CDMA). In one embodiment, the downhole telemetry system comprises one or more downhole transmitters and an uphole receiver. Each of the downhole transmitters transmits a corresponding uplink signal which is generated using amplitude modulation of corresponding code word signals. The code word signals are orthogonal to each other, and the transmitters may be configured to adjust the timing to assure synchronous arrival of the various uplink signals at the receiver. Each of the transmitters may be allocated a different number of code words when it is desired to allow for unequal bandwidth requirements. Such allocation is preferably dynamic. Additional modulation techniques may be employed with CDMA, including frequency division multiplexing, time division multiplexing, and frequency reuse. In the preferred embodiment, the uplink signals are transported over a multi-conductor wireline cable, but other physical channels are also contemplated.

The preferred embodiment is expected to transport over one mega-byte per second on 30,000 feet of 7-conductor cable. Other potential advantages may include reduction of the tool string due to elimination of a dedicated telemetry sub, reduced inter-tool wiring due to elimination of existing inter-tool data buses, and a self-configuring system.

BRIEF DESCRIPTION OF THE DRAWINGS

For a detailed description of the preferred embodiments, reference will now be made to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the Earth; but rather, describes only the relative location of the surface and subsurface pieces of equipment such that subsurface equipment is downhole of surface equipment. Similarly the terms uphole and downhole are relative terms indicating direction along the axis of a borehole. Uphole indicates a direction toward the well head, whereas downhole indicates a direction away from the well head.

DETAILED DESCRIPTION

Figure 1:
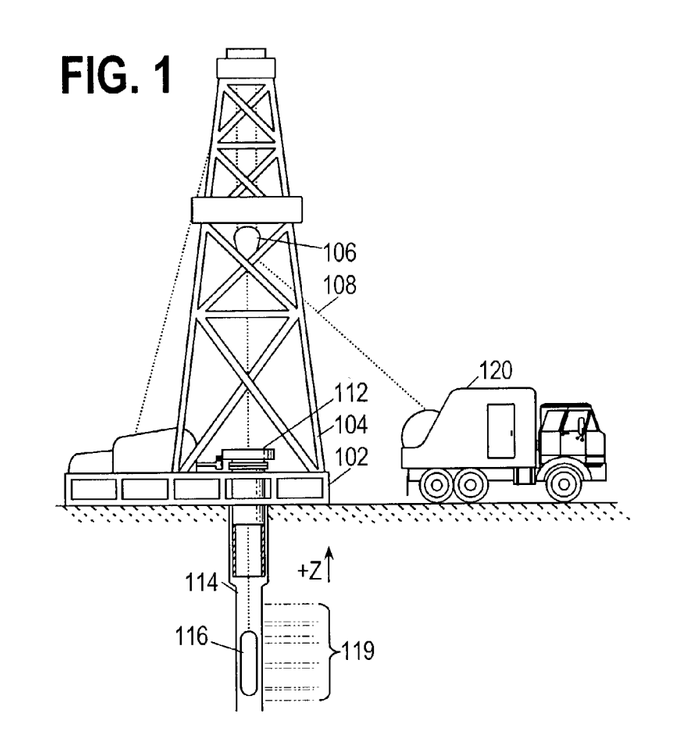
FIG. 1 shows wireline sonde being run through a well.

Turning now to the figures, FIG. 1 shows a well during wireline logging operations. A drilling platform 102 is equipped with a derrick 104 that supports a hoist 106. Drilling of oil and gas wells is commonly carried out by a string of drill pipes connected together so as to form a drilling string that is lowered through a rotary table 112 into a wellbore 114. In FIG. 1, it is assumed that the drilling string has been temporarily removed from the wellbore 114 to allow a sonde 116 to be lowered by wireline 108 into the wellbore. Typically, the sonde 116 is lowered to the bottom of the region of interest and subsequently pulled upward at a constant speed. During the upward trip, the sonde 116 performs measurements on the formations 119 adjacent to the wellbore as they pass by. The measurement data is communicated to a logging facility 120 for storage, processing, and analysis. The sonde 116 and the logging facility 120 preferably employ telemetry transmitters and receivers having code modulation suitable for a code-division multiple access (CDMA) protocol.

It is noted that the following telemetry system discussion will be presented in the context of a wireline system. However, it is recognized that this telemetry system may also be used for LWD and downhole seismic imaging, and the claims in general are not limited to wireline systems.

Figure 2A:
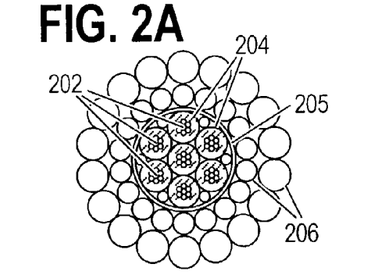
FIGS. 2A and 2B show a cross-section of a seven-conductor wireline cable.
Figure 2B:
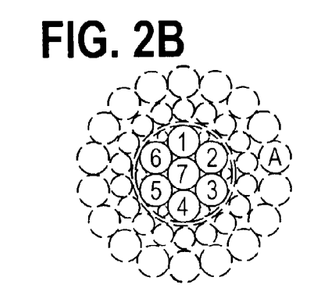
Figure 3:
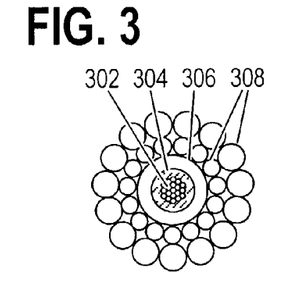
FIG. 3 shows a cross-section of a single-conductor logging cable.
Figure 4:
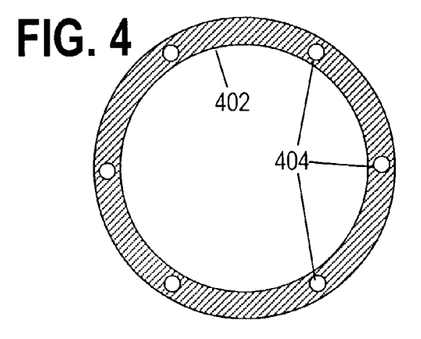
FIG. 4 shows a cross-section of composite tubing with electrical conductors embedded in the wall.

FIG. 2A shows a cross-section of a typical wireline cable having multiple conductors 202. Each of the conductors is surrounded by an insulating jacket 204. The insulated conductors are bundled together in a wrap 205, which in turn is surrounded by two layers of counterwound metal armor wire 206. Being made of metal, the armor wires are conductive and may be used as an eighth conductor. For the sake of convenience, FIG. 2B shows a cross-section of the same wireline cable having its conductors numbered 1–7 and its armor labeled A. This notation will be used in describing the use of transmission modes below. In wireline logging of cased and cemented wells, a single conductor logging cable such as that shown in FIG. 3 may be preferred. The single conductor cable typically has a single, multi-stranded conductor 302 encased in insulative material 304 and wound within a fabric liner 306 which is in turn wound within a double layer of counter wound metal armor wires 308. FIG. 4 shows a cross-section of yet another alternative: composite tubing 402 with embedded conductors 404. The conductors 404 are preferably equally spaced around the circumference of the tubing, and wound helically along its length.

Power and telemetry are typically conveyed together on a single cable. In single conductor cables, the power is generally transmitted as a low frequency signal, whereas the telemetry signal(s) are transmitted in a higher frequency band. In multi-conductor cables, the signal isolation is typically further improved by the use of orthogonal transmission modes. Orthogonal modes and telemetry circuits therefor are discussed in detail in U.S. patent application Ser. No. 09/437,594, entitled "High-Power Well Logging Method And Apparatus" by inventors G. Baird, C. Dodge, T. Henderson and F. Velasquez, which is hereby incorporated herein by reference.

In brief, orthogonal transmission modes offer a method for avoiding the effects of cross-coupling induced by inter-conductor capacitance in long cables. Each mode involves a selection of signal amplitudes and polarities on each conductor. The amplitude and polarity arrangement for each mode is designed to be "orthogonal" to the arrangements for the other modes (i.e., the inner product of the signal vectors is zero). Absent nonlinear effects, each of the modes is in this manner isolated from the other modes. A popular mode for telemetry signals on a seven conductor cable is commonly denoted Mode 6 (abbreviated M6).

Figure 5:
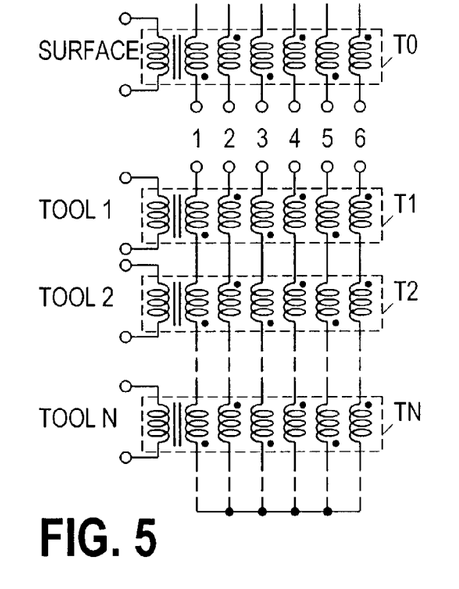
FIG. 5 shows a transformer configuration for coupling multiple tools to one orthogonal mode transmission of a multi-conductor cable.

Referring to FIG. 2B, Mode 6 is carried on conductors 1–6 by exciting the odd-numbered conductors and even-numbered conductors in equal but opposite polarities. FIG. 5 shows one telemetry system embodiment in which CDMA telemetry signals are transported using Mode 6 of a multi-conductor cable. In this embodiment, one or more tools 1 through N are each coupled to the multi-conductor cable via corresponding transformers T1 through TN. Focusing momentarily on transformer T1, any varying signal provided to the primary winding is impressed in opposing polarities on the even and odd numbered conductors 1–6. This signal is additive, so that the final signal transported over each conductor is the summation of individual signals impressed on the conductor. (Cross-coupling effects can be neglected due to the use of orthogonal modes, although they do manifest in the form of different spectral responses for each mode.) The final signal is reproduced at the surface by transformer T0. In the preferred embodiment, Mode 6 is reserved for telemetry, but in alternative embodiments it may be used to carry power and/or downlink signals.

Figure 6:
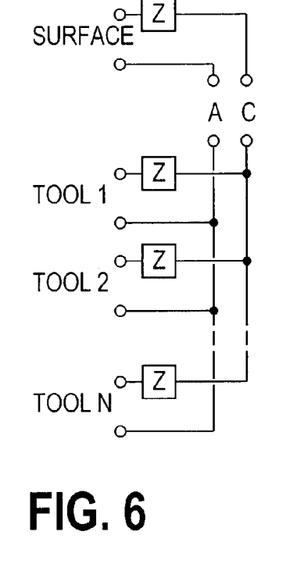
FIG. 6 shows an impedance-divider configuration for coupling multiple tools to a single conductor cable.

FIG. 6 shows a second telemetry system embodiment in which CDMA telemetry signals are transported by a single conductor logging cable. In this figure, "A" denotes the cable armor, and "C" denotes the center conductor. In this embodiment, each of the one or more tools are directly coupled to a common ground (on armor A) and are coupled to the center conductor via an impedance Z. The impedance Z may be capacitive, inductive, resistive, or a combination thereof. This configuration is commonly termed an "impedance divider", or a "resistance divider" when all the impedances are resistive. The impedances are preferably equal. For a bi-directional system, the surface installation is coupled to the cable in a similar fashion. For a uni-directional telemetry system, the impedance at the surface may be eliminated.

Note that these are exemplary embodiments, and are not intended to be limiting. In particular, a transformer configuration may be employed with the single conductor cable, and an impedance divider configuration may be employed with multi-conductor cables, with or without the use of orthogonal modes.

In synchronous code division multiple access (SCDMA), the preferred modulation technique for this application, information is transmitted by modulating a code word in much the same way that a carrier wave is modulated in amplitude modulation (AM) systems. Each transmitter has at least one unique code word, and some transmitters may be allowed multiple unique code words. The code words are designed to minimize interference between different transmitters. These code words are sometimes referred to as a "spreading code" because they distribute the information signal across a relatively wide range of signal frequencies.

In both CDMA and SCDMA, the code words assigned to different transmitters are mutually orthogonal. When used in this context, the term "orthogonal" means the dot product between different code word signals is zero. Multiple words are mutually orthogonal if and only if the dot products of all possible pairs of different code words are zero. Preferably, the code word signals are also orthonormal, meaning that each of the code words have the same magnitude.

Figure 7:
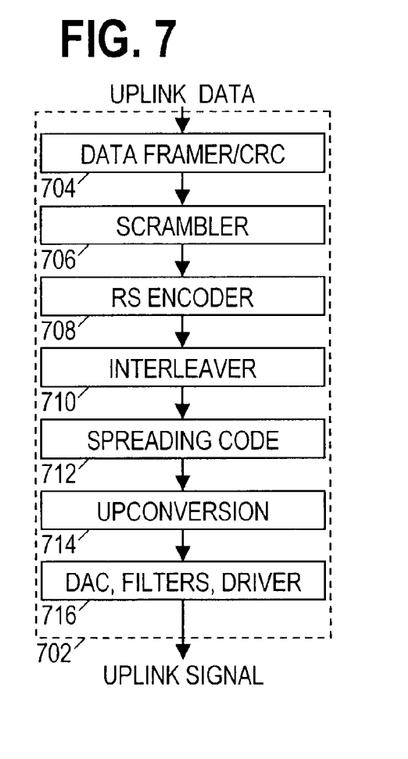
FIG. 7 shows a code division multiple access (CDMA) downhole transmitter.

FIG. 7 shows an exemplary telemetry transmitter 702. In block 704, the uplink data is grouped into data frames, and a cyclic redundancy check (CRC) code is appended to each frame. The CRC code makes detection of data corruption relatively straightforward on the receiving end. In block 706, the data frames are "scrambled" by combining the data frames with a pseudo-random sequence. The combining typically takes the form of a bit-wise exclusive-or (XOR) operation. The scrambling has the effect of making the data resemble a random data stream, which generally proves to be beneficial for encoding and transmission purposes.

In block 708, an error correction code is applied to the data stream. Error correction codes are designed to add sufficient redundancy to the data stream to allow for the correction of a limited number of errors in each region of the data stream. Although a wide variety of codes exist and may be used for error correction, Reed-Solomon (RS) codes tend to be preferred for their straightforward decoding algorithms. In block 710, the data stream is interleaved. The interleaving operation has the effect of separating adjacent portions of the data stream with distant portions of the data stream. The interleaving operation serves to protect against "error bursts" in the channel, i.e., a large number of errors in a very short time. When the data stream is de-interleaved at the receiver, the error bursts are broken up into isolated errors.

In block 712, a spreading code is applied to the data stream to produce a spread spectrum signal. The bit rate of the spreading code is significantly higher than the bit rate of the data stream, and it is the rate of the spreading code that largely determines the bandwidth of the resulting signal. In block 714, the spread spectrum signal is mixed with a carrier frequency to move the spread spectrum signal into a desired frequency band. In block 716, digital to analog conversion (DAC), filtering, and amplification is performed to produce an analog uplink signal suitable for transport by the cable. The transmit signal could be applied to the tool ports shown in FIGS. 5–6.

Each of the telemetry transmitter blocks 704–714 described above is optional and may be omitted, though of course, it would not be a CDMA transmitter without the spreading code of block 712. Some re-ordering of the blocks is also possible, though the given arrangement is preferred. When such omitting or re-ordering is done, the receiver configuration is preferably altered to match.

Figure 8:
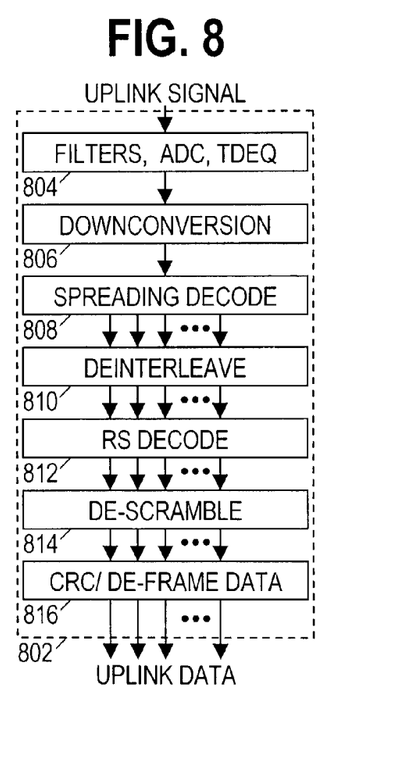
FIG. 8 shows a CDMA uphole receiver.

FIG. 8 shows an exemplary telemetry receiver 802 complementary to transmitter 702. In block 804, the uplink signal is filtered, converted to a digital receive signal, and optionally filtered in the digital domain to compensate for channel effects (TDEQ, or "time domain equalization"). In block 806, the receive signal is shifted in frequency, optionally to baseband, though a predetermined intermediate frequency may be preferred. Note that the receive signal is expected to be a composite signal formed using multiple spreading codes.

In block 808, the spreading codes are applied to the downconverted signal to extract the corresponding data streams. Each of the corresponding data streams may be processed independently thereafter. In block 810, a de-interleave operation is applied to reassemble each data stream in the original order, i.e., the order preceding the interleaving operation in the transmitter. In block 812, an error correction decoding procedure is applied. In block 814, the inverse of the scrambling operation is applied. Finally, in block 816, a final CRC test is performed to detect errors, and barring any such errors, the uplink data streams are rendered in their original form.

Figure 9:
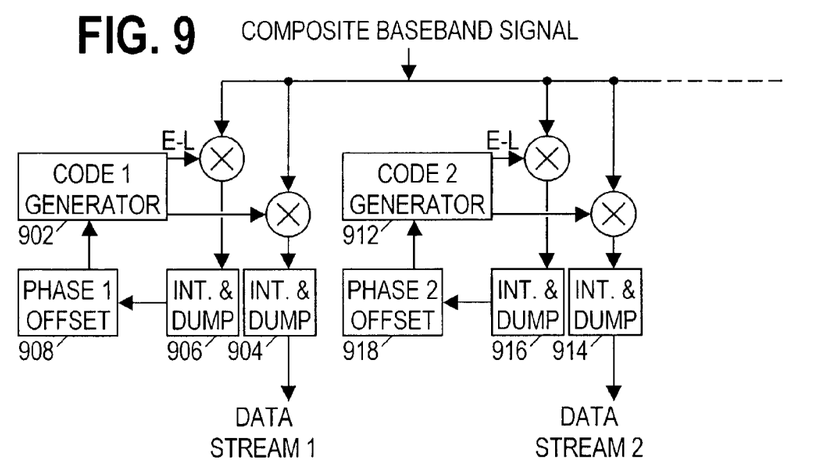
FIG. 9 shows spreading code decoder.

FIG. 9 shows an exemplary embodiment of a spreading decoder 808. A code generator 902 generates signal comprising a code word used by one of the tools downhole. The code generator further calculates an early-minus-late (E-L) code word signal as discussed further below. The code word signal and E-L signal are each mixed with the received signal. The product of the code word signal and the received signal is integrated by integrate and dump (IAD) component 904. Similarly, the product of the E-L signal and the received signal is integrated by IAD 906. At the end of each code word cycle (i.e., the time taken to cycle through a complete code word), the IADs 904, 906 provide ("dump") their integrated values as output signals, and begin integrating again from zero. If the timing is properly aligned, the integrated values from IAD 904 represent the data stream received by the corresponding spreading encoder downhole. A phase offset register 908 provides proper timing alignment by processing the integrated values from IAD 906. In the preferred embodiment, there is a corresponding arrangement of code generator, mixers, IAD components, and phase offset register for each code word used by the set of downhole transmitters, e.g., elements 912–918.

Figure 10:
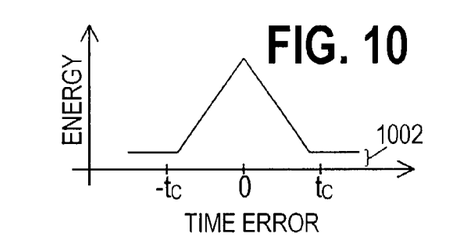
FIG. 10 shows a graph of correlation versus timing error.

Timing alignment is now explained with reference to FIGS. 10–11. FIG. 10 shows the noise-free output of IAD 904 as a function of timing error (defined as "true" time minus time provided to the code generator). The output indicates the correlation of the code word signal with the receive signal. The correlation assumes the form of a triangular peak having a maximum value when the timing error is zero, and falling off to a background value 1002 as the timing error increases in magnitude. The background value 1002 reflects cross-correlation between code words. The background value 1002 can be eliminated by employing SCDMA, since the cross-correlation between synchronously received code words is zero. This is discussed again further below. The width of the triangular peak is twice the "chip" time $t_C$, that is, twice the time period for each bit of the code word signal.

Figure 11:
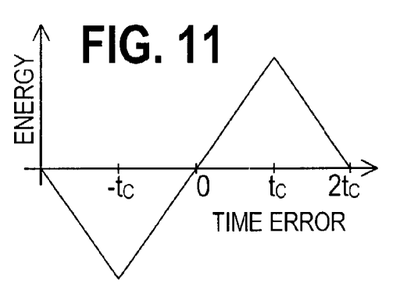
FIG. 11 shows a graph of early minus late signal correlation.

FIG. 11 shows the noise-free output of IAD 906 as a function of timing error. This correlation of the receive signal with the E-L signal may be used to adjust the phase offset in register 908. The phase offset is adjusted upward (to advance the code word slightly) when the E-L correlation is negative (indicating that the code word signal is late). Conversely, the phase offset is adjusted downward when the E-L correlation is positive. A timing algorithm operates to minimize the timing error.

Figure 12:
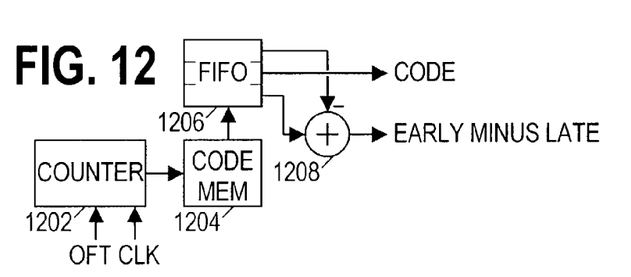
FIG. 12 shows a code generator for the spreading code decoder.

FIG. 12 shows a preferred implementation of code generator 902. In response to a clock signal CLK, a wrap-around counter 1202 cycles through the addresses for code memory 1204 once for each code word cycle, beginning at a programmable offset OFT. Note that a fine-grain phase resolution may be provided by using a high clock frequency and high-resolution counter, and driving the memory address lines with only the most significant bits of the counter.

The contents of the code memory 1204 are passed to a first-in-first-out (FIFO) buffer 1206 having three registers. The first register contains an "early" code bit, the second register contains a "current" code bit, and the third register contains a "late" code bit. The contents of the current code bit register are provided as the code word signal, and the contents of the early and late registers are combined by adder 1208 to provide the E-L signal.

In the code generator for a transmitter, a simpler version may be preferred. In the simpler version, the FIFO 1206 and adder 1208 are eliminated. The counter 1202 cycles through the memory addresses as before, and the output of the code word memory 1204 is directly used to obtain the code word signal.

Figure 13:
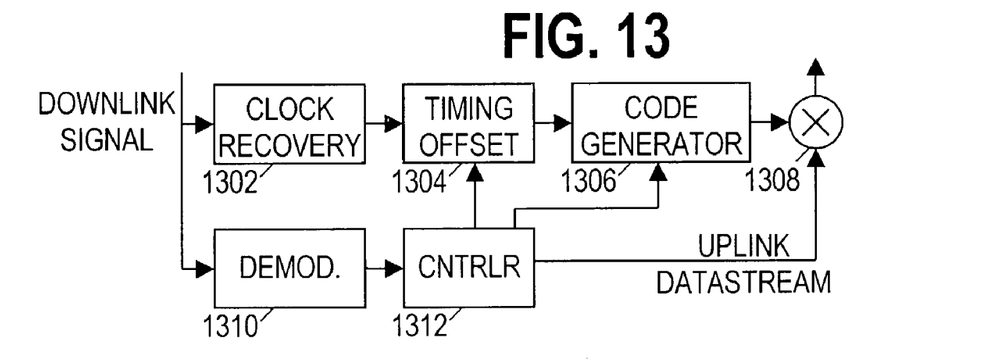
FIG. 13 shows a downhole transceiver.

FIG. 13 shows a preferred embodiment the communications block of a downhole tool. A downlink signal is preferably provided from the surface. The downlink signal preferably includes commands for controlling the downhole tool, and is preferably designed to provide clock signal information. A clock recovery block 1302 derives a clock signal from the downlink signal. The clock signal is preferably phase-locked to the downlink signal, but may have a multiplied frequency if desired. A timing offset block 1304 preferably adjusts the clock signal phase so as to provide for synchronization of receive signals at the surface. This may be accomplished with a programmable delay line, or by other means. The timing offset block 1304 provides an adjusted-phase clock signal to the code generator, which in turn provides a code word signal to mixer 1308.

Block 1310 receives the downlink signal and extracts commands directed at the downhole tool. Controller 1312 receives the commands and operates accordingly. At least one of the commands preferably provides for adjustment of the timing offset block 1304, and another preferably provides for selection of the code word(s) to be used by code generator 1306. Tool data is preferably gathered by controller 1312 and provided in an uplink data stream signal to mixer 1308. Note that the uplink data stream can be divided into multi-bit symbols. Each symbol preferably indicates a desired amplitude level of a code word for one code word cycle. The overall uplink encoding process preferably follows the flow shown in FIG. 7. (Much of the process may be done in software by controller 1312.) Note that where multiple code words are used, each uplink signal stream is preferably encoded independently, and the signal streams are not combined until after the spreading code modulation has been performed.

The surface receiver preferably determines the propagation delay associated with each of the downhole transmitters, and preferably transmits appropriate timing offset adjustments to each of the downhole transmitters. In the preferred embodiment, the code words are Walsh codes, but other orthogonal sets of code words may be used. For details, see Walsh, J. L., "A closed set of orthogonal functions", American Journal of Math., vol.55, pp. 5–24, 1923. These functions have the desirable property that they are bipolar, i.e., the amplitude of each function is either +1 or −1. See also H. F. Harmuth, in "Applications of Walsh functions in communications", IEEE Spectrum 1969. Each downhole transmitter preferably has at least one unique pre-assigned code word. In the preferred embodiment, additional code words can be dynamically assigned to downhole transmitters having greater bandwidth requirements.

Figure 14:
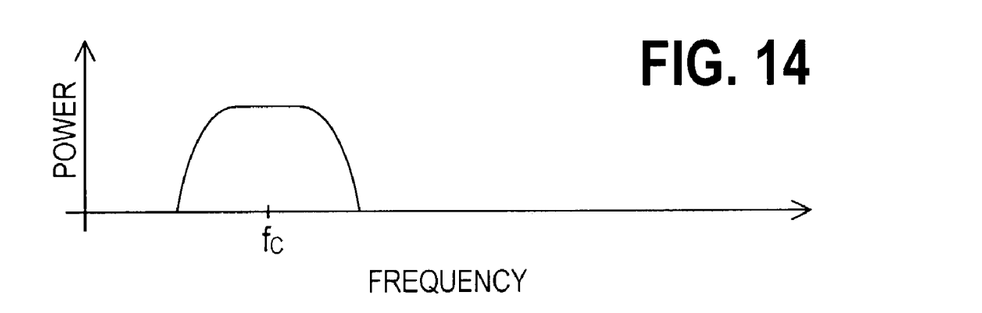
FIG. 14 shows a simple CDMA spectrum.
Figure 15:
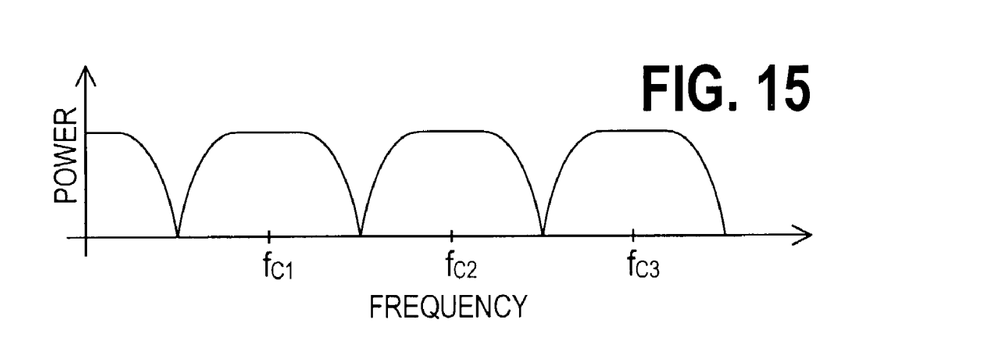
FIG. 15 shows a spectrum produced by using both CDMA and frequency division multiplexing.

In an alternate embodiment, the signaling scheme is CDMA, and no synchronization is enforced between the downhole transmitters. In both the CDMA and SCDMA embodiments, additional multiplexing methods can be incorporated. FIG. 14 shows an exemplary CDMA spectrum centered around a carrier frequency $f_C$. Additional capacity may be provided using frequency division multiplexing as shown in FIG. 15. SCDMA systems can also use frequency division multiplexing, and can additionally or alternatively use time division multiplexing and/or frequency re-use. In time division multiplexing, different transmitters take turns using a given code word or set of code words. In frequency re-use, orthogonal carrier signals carry different SCDMA signals.

It is noted that the above signaling scheme may be desirable for systems having only one downhole transmitter. Each code word used by the downhole transmitter can be a "channel" that is separate from other channels. Such a division may be useful for sending to separate receivers at the surface, and/or for maintaining separate channels for different data streams.

The above discussion is meant to be illustrative of the principles and various embodiments of the present invention. For example, the present invention has been discussed in the context of wireline logging. However, it may also prove advantageous in the context of LWD, particularly in when composite tubing is used. One particular transmission medium may be a long hollow nonconducting pipe with 6 equally spaced electrical conductors embedded within the wall of the flexible pipe. Numerous other variations and modifications will become apparent to those skilled in the art once the above disclosure is fully appreciated. It is intended that the following claims be interpreted to embrace all such variations and modifications.

What is claimed is:

1. A downhole telemetry system that comprises:
   a first downhole transmitter that transmits a first uplink signal, wherein the first uplink signal is generated using amplitude modulation of a first uplink data stream onto a first code word signal;
   a second downhole transmitter that transmits a second uplink signal, wherein the second uplink signal is generated using amplitude modulation of a second uplink data stream onto a second code word signal, wherein the first and second code word signals are orthogonal; and
   an uphole receiver that receives a composite uplink signal including the first and second uplink signals in combined form, wherein the receiver is configured to extract the first and second uplink data streams from the composite uplink signal,
   wherein the first and second downhole transmitters are configured to adjust timing of the first and second code word signals, respectively, so as to provide synchronization of the first and second uplink signals at the uphole receiver.

2. The downhole telemetry system of claim 1, further comprising:
   additional downhole transmitters that each transmit corresponding uplink signals, wherein the corresponding uplink signals are generated using amplitude modulation of corresponding uplink data streams onto corresponding code word signals, wherein the code word signals are mutually orthogonal.

3. The downhole telemetry system of claim 1, wherein the code word signals are based on Walsh codes.

4. The downhole telemetry system of claim 1, wherein the first uplink signal is further generated by upconversion using a first carrier signal.

5. The downhole telemetry system of claim 4, further comprising:
   a third downhole transmitter that transmits a third uplink signal, wherein the third uplink signal is generated using amplitude modulation of a third uplink data stream onto a third code word signal, wherein the first and third code word signals are substantially identical, wherein the third uplink signal is further generated by upconversion using a third carrier signal having a frequency equal to that of the first carrier signal, wherein said third carrier signal is ninety degrees out of phase with the first carrier signal.

6. The downhole telemetry system of claim 1, wherein the downhole transmitters are coupled to the uphole receiver via a multi-conductor logging cable which carries the composite uplink signal in one of a set of orthogonal transmission modes to the uphole receiver.

7. The downhole telemetry system of claim 1, wherein the downhole transmitters are each coupled to a logging cable via corresponding transformers, and wherein the logging cable transports the composite uplink signal to the uphole receiver.

8. The downhole telemetry system of claim 1, wherein the downhole transmitters are each coupled to a logging cable in an impedance-divider configuration, and wherein the logging cable transports the composite uplink signal to the uphole receiver.

9. The downhole telemetry system of claim 1, wherein the first uplink signal is protected against burst errors by interleaving.

10. The downhole telemetry system of claim 1, wherein the first uplink signal is protected against errors by error correction coding.

11. The downhole telemetry system of claim 1, wherein the first and second transmitters are contained within different tools of a wireline sonde.

12. The downhole telemetry system of claim 1, wherein the first and second transmitters are contained within different logging-while-drilling tools of a drillstring.

13. A downhole telemetry system that comprises:
    a first downhole transmitter that transmits a first uplink signal, wherein the first uplink signal is generated using amplitude modulation of a first uplink data stream onto a first code word signal;
    a second downhole transmitter that transmits a second uplink signal, wherein the second uplink signal is generated using amplitude modulation of a second uplink data stream onto a second code word signal concurrently with amplitude modulation of a third uplink data stream onto a third code word signal, wherein the first and second code word signals are orthogonal, and wherein the third code word signal is orthogonal to the first and second code word signals; and
    an uphole receiver that receives a composite uplink signal including the first and second uplink signals in combined form, wherein the receiver is configured to extract the first and second uplink data streams from the composite uplink signal.

14. The downhole telemetry system of claim 13, wherein the second downhole telemetry transmitter is configured to use a programmable number of code word signals to generate the second uplink signal.

15. The downhole telemetry system of claim 13, further comprising a surface unit coupled to the uphole receiver and coupled to a uphole transmitter, wherein the surface unit is configured to dynamically assign code words to downhole transmitters, and wherein the surface unit is configured to communicate that assignment to the downhole transmitters via the uphole transmitter.

16. A downhole telemetry system that comprises:
- a first downhole transmitter that transmits a first uplink signal, wherein the first uplink signal is generated using amplitude modulation of a first uplink data stream onto a first code word signal, wherein the first uplink signal is further generated by upconversion using a first carrier signal;
- a second downhole transmitter that transmits a second uplink signal, wherein the second uplink signal is generated using amplitude modulation of a second uplink data stream onto a second code word signal, wherein the second uplink signal is further generated by upconversion using a second carrier signal having a frequency different from that of the first carrier signal, wherein the first and second code word signals are orthogonal; and
- an uphole receiver that receives a composite uplink signal including the first and second uplink signals in combined form, wherein the receiver is configured to extract the first and second uplink data streams from the composite uplink signal.

17. A downhole telemetry system that comprises:
- a first downhole transmitter that transmits a first uplink signal, wherein the first uplink signal is generated using amplitude modulation of a first uplink data stream onto a first code word signal;
- a second downhole transmitter that transmits a second uplink signal, wherein the second uplink signal is generated using amplitude modulation of a second uplink data stream onto a second code word signal, wherein the first and second code word signals are orthogonal;
- an uphole receiver that receives a composite uplink signal including the first and second uplink signals in combined form, wherein the receiver is configured to extract the first and second uplink data streams from the composite uplink signal; and
- a third downhole transmitter that transmits a third uplink signal, wherein the third uplink signal is generated using amplitude modulation of a third uplink data stream onto a third code word signal, wherein said first and third code word signals are based on the same code word, wherein said first and third uplink signals are nonzero only at different times.

18. A downhole telemetry system that comprises:
- a first downhole transmitter that transmits a first uplink signal, wherein the first uplink signal is generated using amplitude modulation of a first uplink data stream onto a first code word signal; and
- a second downhole transmitter that transmits a second uplink signal, wherein the second uplink signal is generated using amplitude modulation of a second uplink data stream onto a second code word signal, wherein the first and second code word signals are orthogonal; and
- an uphole receiver that receives a composite uplink signal including the first and second uplink signals in combined form, wherein the receiver is configured to extract the first and second uplink data streams from the composite uplink signal
- wherein the second downhole transmitter generates a third uplink signal using amplitude modulation of a third uplink data stream onto said second code word signal, wherein the second downhole transmitter upconverts the second uplink signal using a first carrier signal having a given frequency, and wherein the second downhole transmitter upconverts the third uplink signal using a second carrier signal having said given frequency, wherein the second carrier signal is orthogonal to the first carrier signal.

* * * * *